United States Patent [19]
Rivera

[11] Patent Number: 6,056,209
[45] Date of Patent: May 2, 2000

[54] CHEMICAL-FREE SOLUTION TREATMENT PROCESS

[76] Inventor: Jose E. Rivera, 11 Erskine St., P.O. Box 115, Port Costa, Calif. 94569

[21] Appl. No.: 08/813,796

[22] Filed: Mar. 6, 1997

[51] Int. Cl.[7] .................................................. D06B 19/00
[52] U.S. Cl. .............................. 239/142; 8/142; 68/13 R; 68/17 R
[58] Field of Search ..................... 239/142, 143, 239/144, 337; 8/142; 68/13 R, 17 R

[56] References Cited

U.S. PATENT DOCUMENTS

| | | |
|---|---|---|
| 672,074 | 4/1901 | Burton . |
| 1,582,225 | 4/1926 | Pulkinghorn ............................ 239/142 |
| 5,309,739 | 5/1994 | Lee ........................................ 68/3.055 |
| 5,421,174 | 6/1995 | Kim et al. ................................. 68/17 A |

*Primary Examiner*—Kevin Shaver
*Assistant Examiner*—David Deal
*Attorney, Agent, or Firm*—David Dolberg, Esq.

[57] ABSTRACT

A process for treating liquids to improve their usefulness without the use of traditional soaps or detergents, primarily through the treatment of a solution by the use of a holding tank and agitator, and treatment therein by a non-soap, non-detergent device such as activated ceramic filled floating containers, floating structured water filled containers, a magnetic liquid treatment pipe, electrodes, and/or other chargers. The liquid is then transported by way of a hose A to a pressure pump, then to hose B, and to a spray wand; or to a container for later use. Cleaning of on-site carpets and upholstery, floors and the like are taught.

19 Claims, 6 Drawing Sheets

CHEMICAL-FREE SOLUTION TREATMENT PROCESS

CROSS REFERENCES TO RELATED APPLICATIONS

1. Background—Field of Invention

This invention relates to treatment of liquids for various purposes, including but not limited to an improved method for creating a cleaning solution which can be used for on-site cleaning of articles such as wall to wall carpet, upholstery, floors, and the like.

2. Background—Description of Prior Art

There are myriad types of cleaning compositions for cleaning carpets, upholstery, floors, etc. Most of these are based on soaps or detergents, both of which are generically referred to as "surfactants". Surfactants, i.e. soaps and detergents, are formulated to loosen and disperse soil. The soil can then be suspended in such a manner that it can be removed from the material being cleaned. The problems associated with the use of surfactants include resoiling, and health problems related to their use. The inherent oily nature of surfactants causes premature resoiling in textiles even when the surfaces have a surfactant coating which is only one molecule thick. Unfortunately, the use of surfactants could pose possible health hazards to anyone handling them. It is well known that surfactants cause irritation or allergic reactions to people who are sensitive to these chemicals. There are also environmental problems associated with the use of soaps and detergents. Some are non-biodegradable and some contain excessive amounts of phosphates which are also environmentally undesirable. Many of these solutions available have very strong chemical odors and can cause respiratory harm to technicians using them. Gloves and respirators are often called for in the Material Safety Data Sheets. Frequently these warnings are not adhered to by service personnel—to the detriment of their health.

The quest for carpet cleaning compositions that have a balance of cleanability and resoiling resistance has resulted in compositions containing unnatural components. Often these have a greater potential to cause allergic reaction and other health and environmental problems. Normal soaps prepared from naturally occurring fats and oils are not suitable for carpet cleaning because of the ability of their residues to attract soils.

This concern over health and the environment has prompted an emphasis on the use of less toxic more natural cleaning components. These products are found to be somewhat less hazardous than other comparable products by different manufacturers, however exposure to these chemicals still cause skin and respiratory disorders, lightheadedness, nausea, etc. Such statements in Material Safety Data Sheets for chemicals in the cleaning industry abound, with many solutions even containing carcinogens.

Studies conducted in the health field have indicated that accumulation of toxins occurs in living tissues of organisms. Exposure to chemical substances which are harmful to the human body, though slight at each instant of contact, could produce long term effects with repeated exposure.

Carpets are cleaned frequently, and need to be due to the problems attendant with dust, dust mites, and other accumulations in them. As carpets and upholstery are cleaned with chemicals, these chemical residues could build up to unhealthy levels.

These chemical residues are not easily removed. One source indicated that as much as 80% or more of the residues put into a carpet remained even after that carpet had been rinsed with water 8 times with a carpet steam cleaning machine. So residue buildup can be a problem with surfactants. The inability to uncover a method of producing completely safe cleaning solutions has been a problem.

In an attempt to circumvent these problems, urea has been used instead of surfactants in carpet cleaning. Urea is a diuretic and so may pose some possible health hazard with continuous exposure also.

The final drawback of chemical solutions in the cleaning field is their cost. In methods such as truck-mounted carpet cleaning, large amounts of pre-treating chemicals (which are often the most hazardous, as they must be the strongest) are often sprayed onto the carpet before the actual extraction procedure begins. Copious amounts of a less formidable solution are used to rinse the soil from the carpet. The total process, then, consumes a fair amount of chemicals which, completely aside from the toxicity issue, are costly.

Companies marketing water softeners have promoted the fact that the use of chemicals could be greatly reduced by softening the water used for cleaning—that 10% of the normal chemical use would be as effective. Some of the disadvantages of these units include the clumsiness of a water softening set-up, the weight of it, and cost of replenishing the zeolite. High levels of sodium, attendant with softened water, have been linked with to a variety of health problems by the American Heart Association.

A method used in the past for removing soil from garments was by the use of electrical charges. The process involved a tank wherein liquid such as water was held. Immersed in this holding apparatus were two electrodes which were either close together to create a spark between them, or far apart to simply force the electrical current throughout the liquid and the garments or whatever items were put therein for cleaning. However, these methods would not work for carpets or upholstery and the like since it is not feasible to toss, for instance, an entire couch into a large water tank for this purpose, or take up wall to wall carpeting and place it in a tank for this type of cleaning. The technology for cleaning garments with the assistance of electricity is nearly a century old. However, the technology advanced has consisted of trapping them within a chamber where they could be electrified.

Another treatment method in the laundering of clothing using electrons has been through the use of activated ceramics laundry disks. This differs from normal ceramic material in that it is mixed with mineral oxides such as silica or alumina. Depending on the mixtures of the compounds, the surfaces are said to generate different wave lengths when heated. In fact, these ceramics are said to convert any normal energy into far-infrared waves in an efficient manner. The combination of effects delivered by the activated ceramics have been used to launder garments effectively. But no provision in the prior art had existed for any means to use these outside of a washing machine's confines either.

Electrically treated tap water has been used in a number of other ways as well. Alkaline and acid water have been created and used for medicinal purposes in the orient for some years, by the use of water ionizers. Alkaline water is said to provide the body with calcium and other vital nutrients. It is bottled and sold in special containers, as the purveyors of it indicate that it loses its alkaline properties over time unless bottled in dark, glass containers. And acid water has been applied to agricultural ends, as a substitute for chemical pesticides. In such use, the alkaline water is a waste product which is normally discarded.

Electrons as such have been utilized in spray washing technologies, to reduce the need for hot solutions that could strip the paint off of surfaces. Cleaning automobiles has been improved thus by passing a washing agent through a magnetic spray tip. The charging of the washing liquid is accomplished in this technique in one momentary pass through the magnetic field. In the cleaning of hardwood floors, however, a magnetic spray-tip application would be inappropriate—hardwood floors are mopped with small amounts of moisture. Therefore a broader use would be limited to instances where spray washing can be effected. Similarly, larger magnets of ceramic or metal materials have been used to condition liquids. They are clamped outside of a pipe, or a special treatment pipe itself is engineered with the magnets contained therein. Results such as reduced scaling in pipes, improved cleaning efficiency, and improved combustion of petroleum products have been cited. However chemicals are still called for if liquid treated this way is to be used for cleaning. Therefore its results are limited.

Another attempt to clean carpets without the use of chemicals is by spot cleaning using a towel, manufactured currently in Sweden of 70% polyester and 30% nylon. The towel is moistened with water and then the spot is rubbed by hand until gone. However a great deal of work must be applied to the small area in order to affect a proper cleaning, which can at times fray the spot.

OBJECTS AND ADVANTAGES

Accordingly, an object and advantage of my invention includes: 1) providing a method which virtually eliminates the need for chemical-additive materials which could cause health concerns, or long term harmful ecological effects and non-biodegradable components; 2) eliminating premature resoiling due to surfactants being used; 3) ensuring that the method is effective in performing the work involved with superior results to chemical solutions currently on the market; 4) that this perform in a very cost effective manner, eliminating much of the need for expensive chemical shipments, retailing, packaging (which fills landfills unnecessarily), etc.; and 5) that it be very simple in its operation and not clumsy to handle or require continual chemical regeneration of the system.

And additional objects and advantages include that traditional scaling or other residue buildup (such as carbon in fuel injectors) be eliminated in connective hardware and in equipment where the treatment process is used, and in fuels much greater economy and ecology be realized than ever before.

Still further objects and advantages will become apparent from a consideration of the ensuing description and accompanying drawings.

Figure 1:
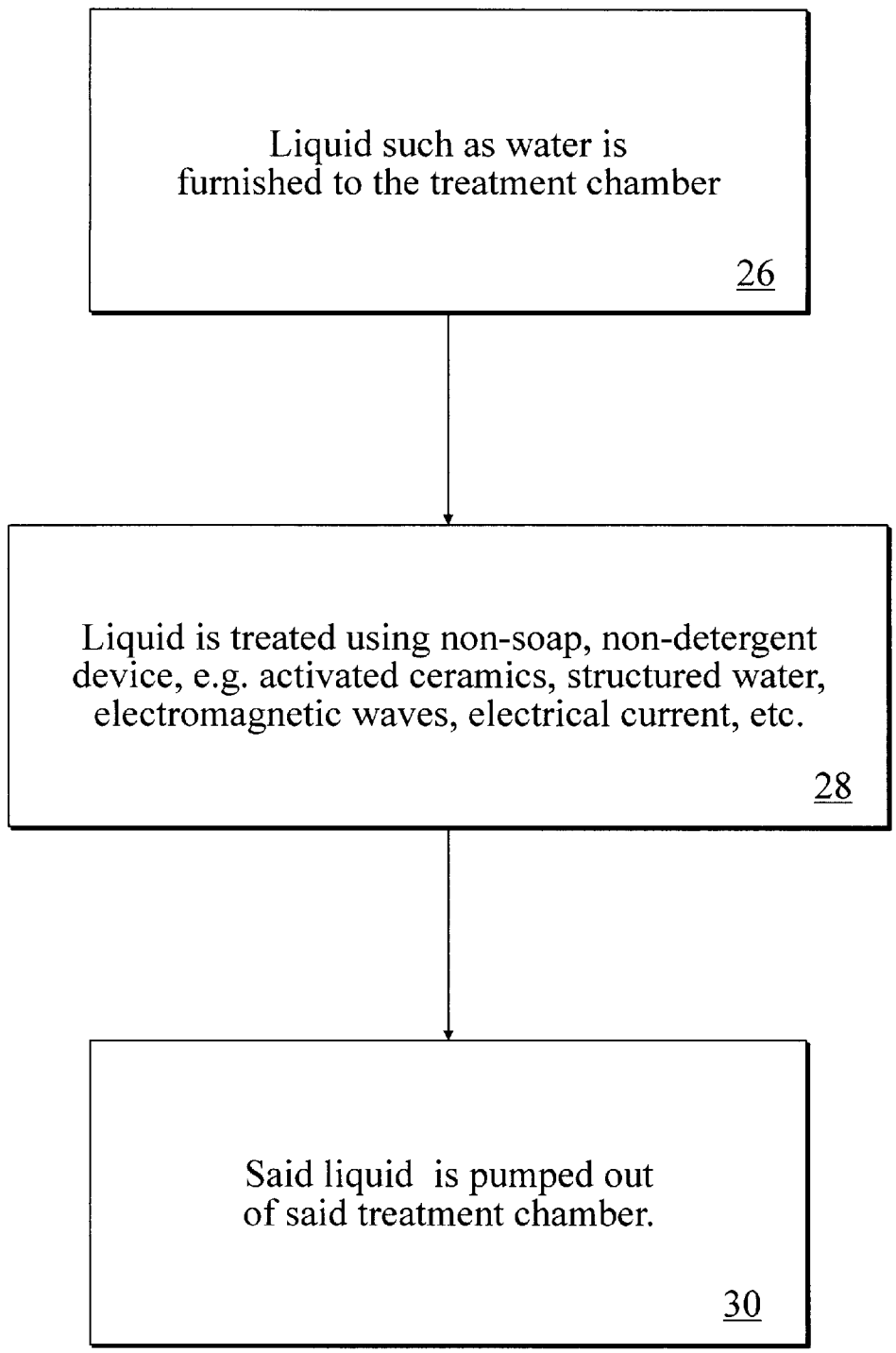
FIG. 1 is a flow chart showing the steps involved in treating the liquid with this method.

REFERENCE NUMERALS 10 holding tank
12 activated ceramic filled floating containers
14 agitator
16 pressure pump
18 hose A
20 hose B
22 spray wand
24 liquid such as water
26 bringing a liquid to a treatment chamber
28 non-soap, non-detergent device
30 delivering the treated solution to the target for cleaning
32 floating structured water filled containers
34 charger
36 power supply
38 a magnetic liquid treatment pipe
40 output plumbing elbow
42 electrode A
44 electrode B

SUMMARY

A process for treating liquids to improve their usefulness without the use of traditional soaps or detergents, primarily through the treatment of a liquid by bringing it to a treatment chamber; treatment therein by a non-soap, non-detergent device; and delivering the treated solution out of this treatment chamber.

PREFERRED EMBODIMENT—DESCRIPTION

Figure 2:
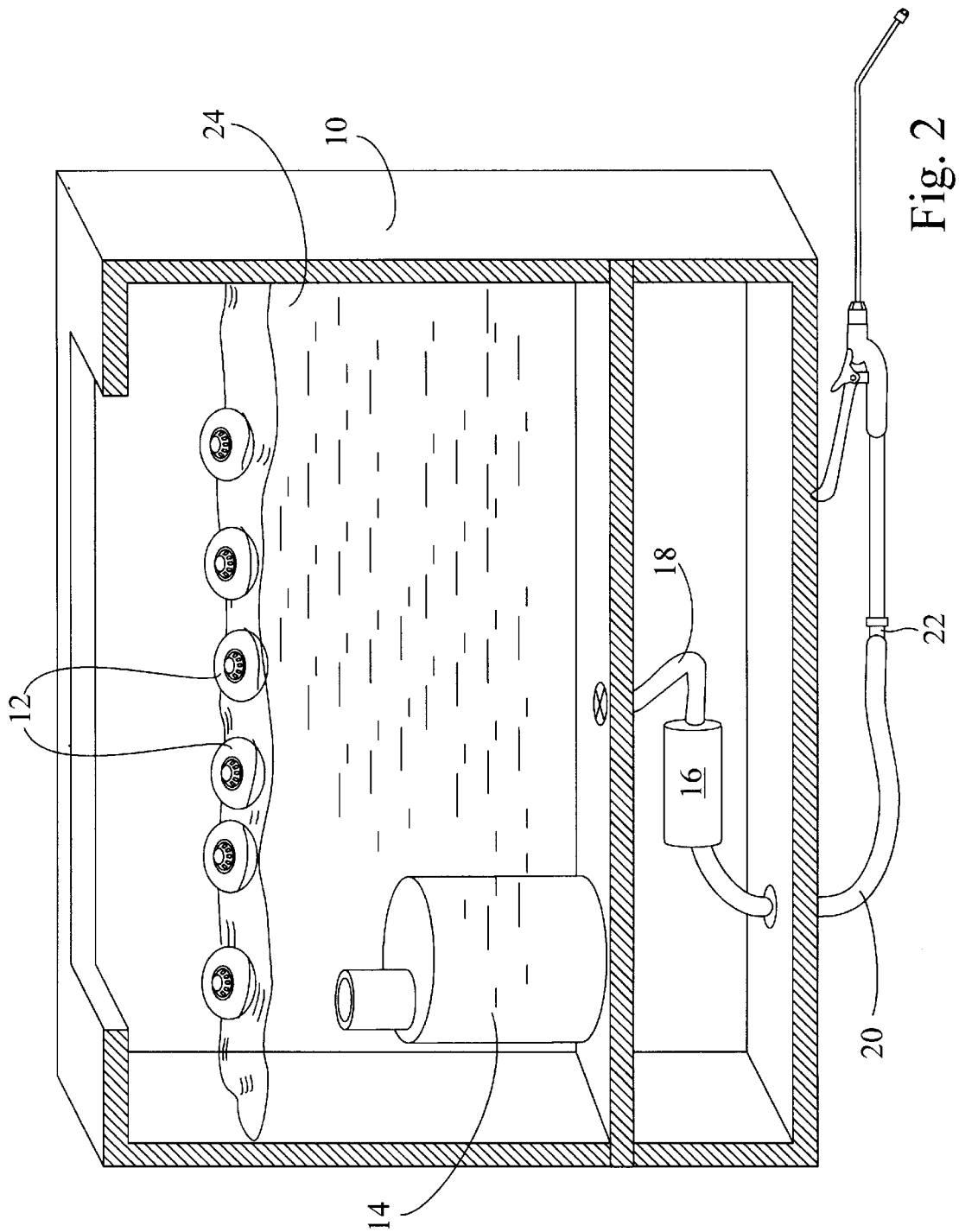
FIG. 2 is a sectional view of a simple apparatus for treating liquid by the use of activated ceramics.

As can be seen from FIG. 2, a holding tank 10 is filled with a liquid such as water 24 at a temperature of about 160 degrees F. Activated ceramic filled floating containers 12 are set afloat in holding tank 10. Activated ceramic containers 12 can be found in health food stores for cleaning laundry. An agitator 14 is situated at the bottom of holding tank 10, comprising a submersible sump pump. A pressure pump 16 is connected to holding tank 10 by a hose A 18. Pressure pump 16 is connected via a hose B 20 to a spray wand 22.

PREFERRED EMBODIMENT—OPERATION

An embodiment of the present invention is herein described, and illustrated in FIG. 2. Holding tank 10 is filled with approximately 16 liters of liquid 24 at a temperature circa 160 degrees F. Added to holding tank 10, six activated ceramic containers 12 convert liquid 24 into a suitable cleaning agent.

Liquid 24 is brought into contact with the activated ceramic containers 12 by the use of agitator 14, which in this case comprises a sump pump capable of moving some 4400 liters per hour. Agitator 14 rests at the bottom of holding tank 10 and churns liquid 24, thus allowing the effects of activated ceramics 12 to be spread throughout the contents of holding tank 10 thoroughly. Converted liquid 24 is then drawn through hose A 18 by pressure pump 16 and sent to spray wand 22 via hose B 20. In the case of on-site carpet cleaning, liquid 24 could then be sprayed onto the surface to be cleaned. There the soil would be emulsified by the solution and could then be removed by one of the traditional soil extraction methods. Either vacuuming or absorption into a traditional cotton carpet cleaning bonnet or pad are effective.

While I am not completely certain as to its validity and do not wish to be bound by it, a published technical summary describes the activated ceramic filled floating containers as follows. It indicates that activated ceramic pellets release electrons due to the presence of metallic elements. This in turn produces ionized oxygen in water, which is a totally natural cleanser which breaks up dirt and organic compounds. The activated ceramics emit far infrared electromagnetic waves which cause water molecules to disassociate, allowing much smaller individual water molecules to penetrate into the innermost part of the fabric and remove dirt particles. The activated ceramics in water produce an abundance of OH ions, reducing the surface tension of water and greatly increasing its penetrating power without the use of surfactants. At a nominal price they are capable of treating tens of thousands of liters of cleaning solution. Their use requires but minimal alteration of existing equipment. These activated ceramic pellets have been found to be effective in the laundering of clothing in a washing machine, however the above theories did not obviously support the cleaning efficiency of the liquid without the direct presence of the activated ceramics. Their use had therefore been limited to laundering clothing in a washing machine.

I found in my research materials that water has some degree of memory. Upon treatment by a magnetic or an electric field, properties such as surface tension and structural activities linger on for some time. It is upon that principle that the workability of this invention was postulated, and in testing proven to be highly effective and productive of unexpectedly desirable results.

Side by side cleaning was performed to compare results of this system to chemical additive solutions. The results were in favor of the process outlined herein, which was astonishing considering the dramatic reduction in operational costs involved. Earlier teachings of the art indicated that plain tap water was not an effective cleaner—see U.S. Pat. No. 5,244,468 by Robert D. Harris and Steven C. Guthrie. In side by side comparisons with several highly regarded chemical formulations currently on the market, the results of the process described herein were superior using plain tap water treated as above. No increase in resoiling properties have been indicated due to its use in extensive testing, which is also at variance with the aforementioned prior art reference. The cleaning ability of the solution alone did not eliminate all need for chemical applications to all spots in every situation—however there is no chemical formulation on the market which can act as a panacea to all spots on carpets or upholstery with any measure of safety. The benefits did include: 1)greater cleaning effectiveness than traditional general cleaning solutions at a greatly reduced operating cost; 2) enhanced safety for the operator by the elimination of exposure to hazardous chemicals to which they would be continually exposed; 3) improved indoor air quality for the occupants of the carpeted dwellings; and 4) elimination of a great deal of packaging materials and resulting costs and waste of landfill space. The tremendous benefits are substantially more than one could reasonably have thought possible with such a simple treatment method.

OTHER EMBODIMENTS

Chemical-Free Treatment Process—Description

FIG. 1—Basic Flow Chart of Process. FIG. 1 shows a possible basic sequence of actions which would produce the desired treatment of liquid. The process could comprise: 1) bringing a liquid to a treatment chamber 26; followed by 2) treatment using a non-soap, non-detergent device 28; followed by 3) delivering the treated solution to the target for cleaning 30.

Chemical-Free Treatment Process—Operation

As can be seen from FIG. 1, treatment chamber 26 brings liquid into contact with any non-soap, non-detergent device 28 thoroughly. FIGS. 2–6 display variations in devices used following this sequence. Though I don't want to be held by it, the following theory is advanced as to the workings of this apparatus. Liquids such as water can retain the structure imparted to them by various treatments for some time. Water, for instance, is the best cleaner there is—we just add things to water to make it clean better. In an environment in which there is a scarcity of electrons, water molecules tend to clump together. Chemical cleaning agents tend to add more electrons to the environment for the water molecules, so they disassociate as there are enough electrons to go around in surplus. Unfortunately, they apparently do this at the expense of loss of some of the natural cleaning ability of the water itself. Thus a liquid such as water cleans better, as it is more able to penetrate into the surface to be cleaned, having had the electrons added, and without the interference of the chemical compounds. And, as it would retain this structure for some time, it is possible to use it as a cleaning agent outside of the confines of the treatment chamber. This new treatment method greatly increases the safety of the technicians and occupants in cleaning situations, and drastically reduces expenses and landfill waste. A similar result would ensue if petroleum-based products were to be put through the same process. Magnetic treatment devices are already being used in this way. But with the greatly improved treatment method outlined herein, far better penetration would occur if the solution were used for cleaning, or greatly improved fuel economy and cleaner burning if used as a fuel.

Structured Water Treatment of Liquid—Description

Figure 3:
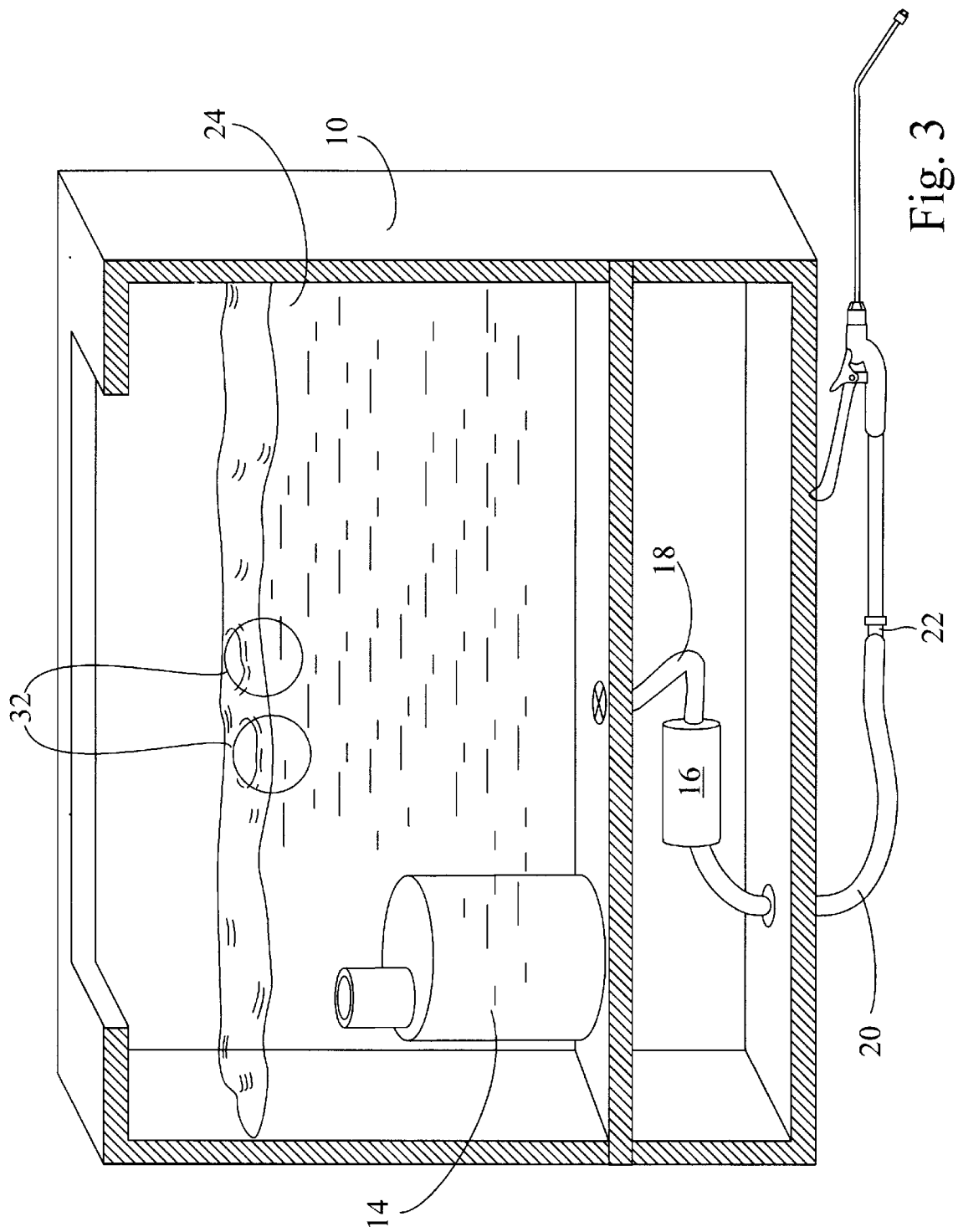
FIG. 3 is a similar view, but where structured water containers are employed.

FIG. 3—Structured Water Treatment. FIG. 3 shows a method wherein non-soap, non-detergent device 28, FIG. 1, comprises one or a number of floating structured water filled containers 32. The remaining parts comprise the same components used in FIG. 2, described above.

Structured Water Treatment of Liquid—Operation

In an alternative embodiment of non-soap, non-detergent device 28 (FIG. 1) shown in FIG. 3, floating structured water filled containers 32 are utilized in tank 10, to convert liquid 24 into suitable cleaning agent. The operation is similar in all other respects to that of FIG. 2, described above.

While I am not completely certain as to its validity and do not wish to be bound by it, a published technical summary describing the floating structured water filled containers indicates that negative charges are emitted through the walls of the container, causing water molecule clusters to disassociate, allowing much smaller individual water molecules to penetrate into the innermost part of a fabric in the cleaning of laundry in washing machines, for which they were designed. They are available from Tradenet Marketing in Dunedin, Fla. Here again we have electrons being added and improving cleaning efficiency.

In testing done using these, they clean on a comparable level with the activated ceramics 12.

Electrical Conductor Treatment of Liquid—Description

Figure 4:
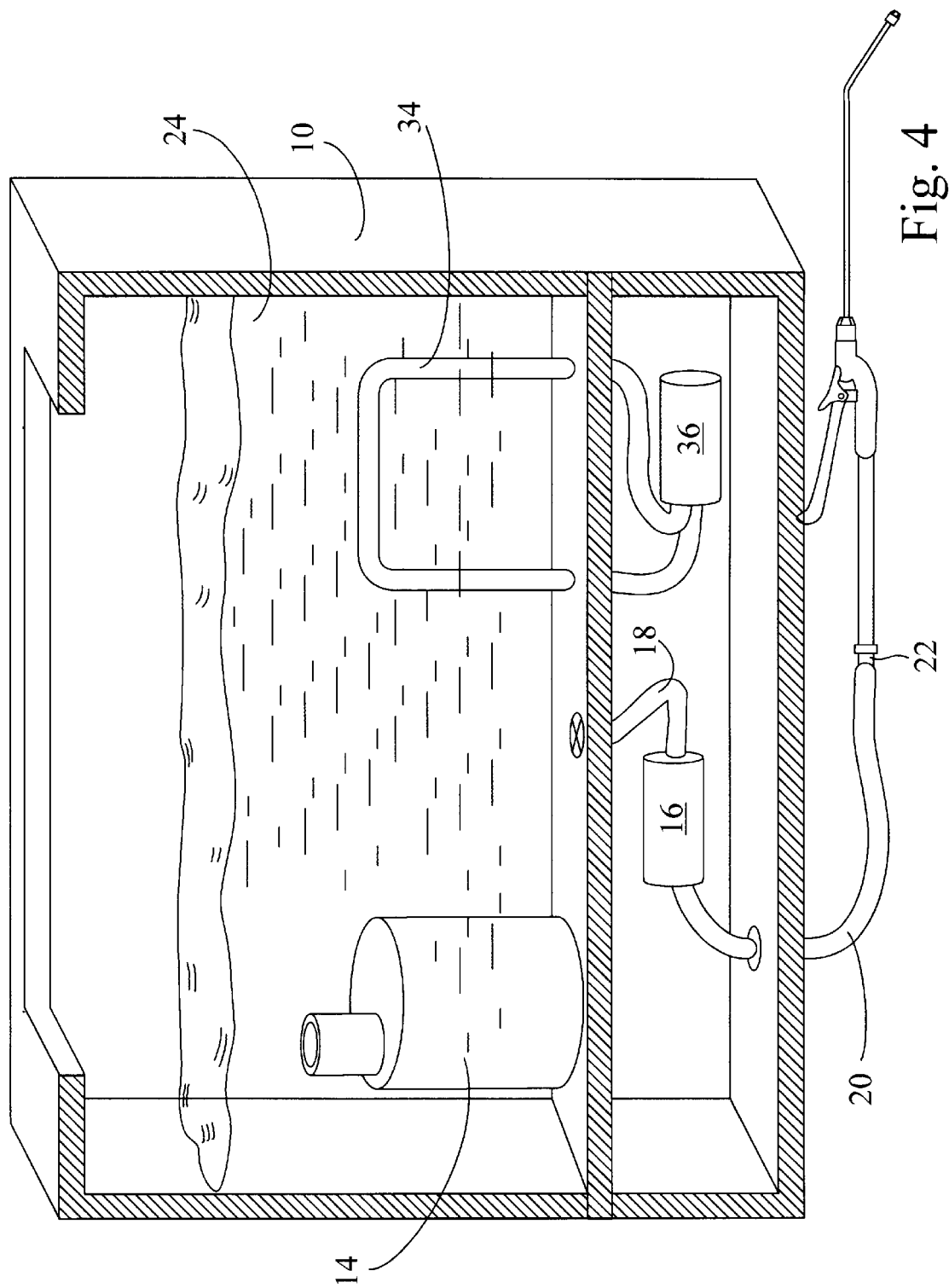
FIG. 4 is a similar view, using an electrical conductor.
Figure 5:
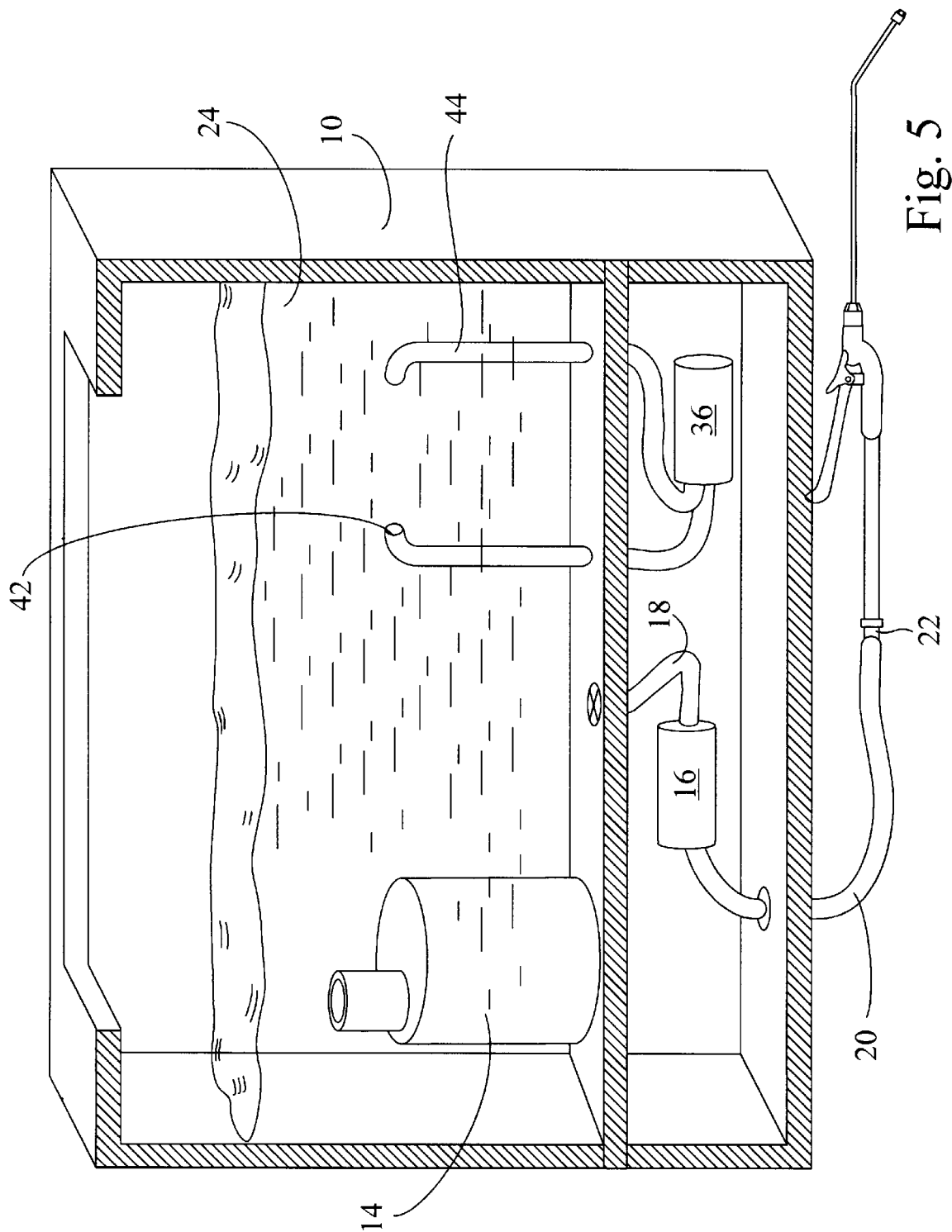
FIG. 5 is a similar view, using an anode and cathode.

FIGS. 4, 5—Electrical Conductor Treatment. FIG. 4 shows a method wherein non-soap, non-detergent device 28 (FIG. 1), comprises a charger 34 composed of one or more conductors such as an aluminum bar or a carbon rod. Charger 34 can be continuous or interrupted, such as an electrode A 42 and an electrode B 44, shown in FIG. 5. In either case, charger 34, or electrodes A 42 and B 44 would be connected to a power supply 36, containing a conventional high quality isolation transformer and related circuitry so as to make the apparatus safe (not shown in detail). The remaining parts comprise the same components used in FIG. 2, described above. As a further guide to the envisioned construction, see U.S. Pat. No. 3,517,674, by Merton Allen and Edward C. Schrom of Jun. 30, 1970 and U.S. Pat. No. 672,074, by George D. Burton of Apr. 16, 1901. Electrodes A 42 and B 44, or charger 34 are secured in place and provided with any suitable leak-proof, heat-insulating sealing means so that tank 10 constitutes an open top container capable of retaining liquid 24. Holding tank 10 could be comprised of a nonconductive material for the purpose of safety.

Electrical Conductor Treatment of Liquid—Operation

In an alternative embodiment of non-soap, non-detergent device 28 (FIG. 1), charger 34 is utilized in holding tank 10, to convert liquid 24 into suitable cleaning agent. The operation in each of FIGS. 4 and 5 are similar in all other respects to that of FIG. 2, described above.

The effects of the electric currents would provide heat through charger 34, but a large percentage would pass through liquid 24. If conductor 34 were composed of carbon, then it would emit far-infrared rays similar to activated ceramics 12, FIG. 2. Probably the best composition would be a metal coated with activated ceramic material.

In the case of FIG. 5, electrodes A 42 and B 44 promote passage of electrical currents through liquid 24, and would effect an improvement of cleaning efficiency, etc.

Magnetic Field Treatment of Liquid—Description

Figure 6:
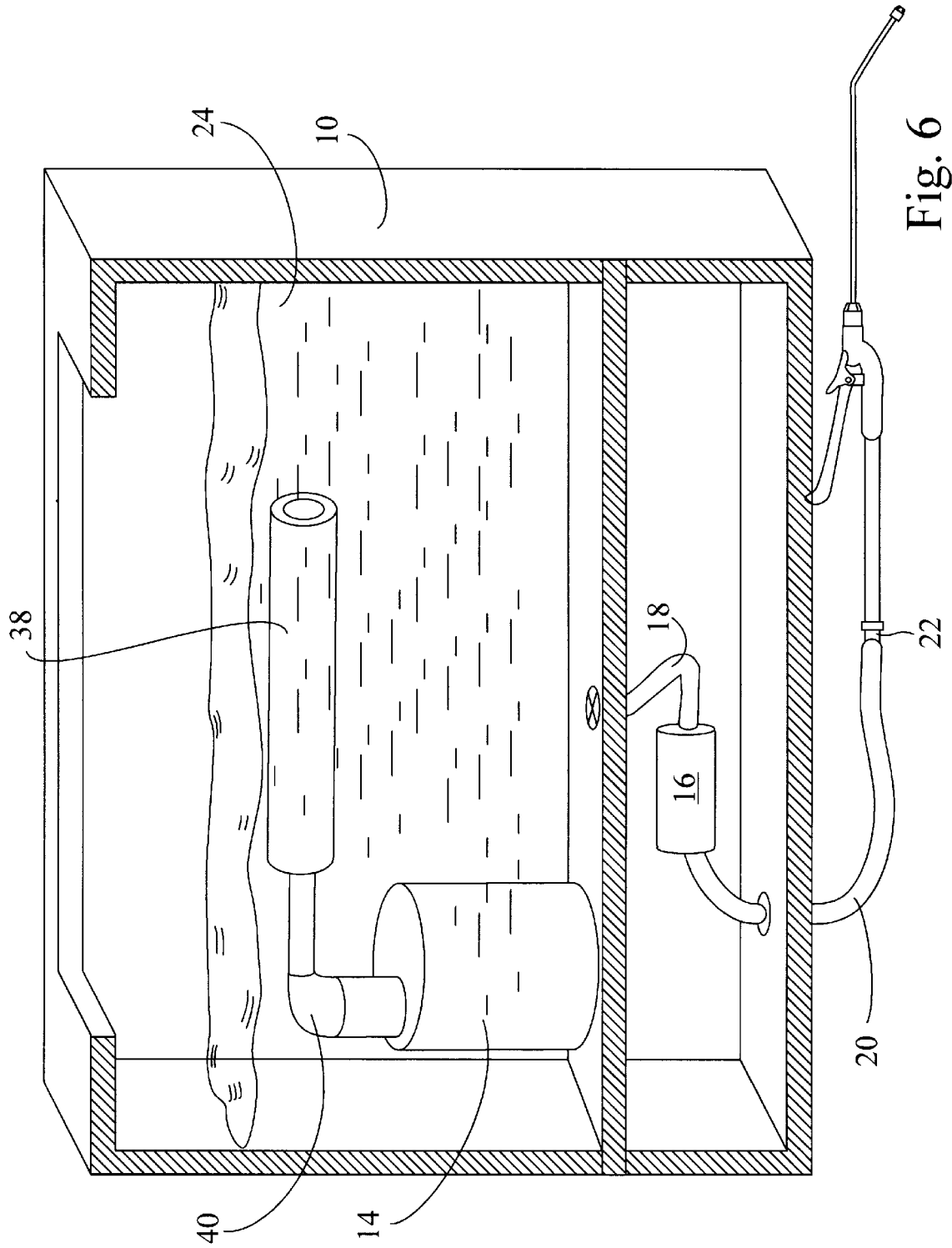
FIG. 6 is a similar view, using a magnetic water treatment device.

FIG. 6—Magnetic Field Treatment. FIG. 6 shows a method wherein device 28 comprises one or a number of permanent magnets or electromagnets, such as a magnetic liquid treatment pipe 38, which is connected directly to an output plumbing elbow 40, attached to agitator 14. The remaining parts comprise the same components used in FIG. 2, described above.

Magnetic Field Treatment of Liquid—Operation

In this embodiment of device 28 shown in FIG. 6, magnetic liquid treatment pipe 38 is utilized in tank 10. The operation is similar in all other respects to that of FIG. 2, described above.

The magnetic field generated by the magnets within pipe 38 act to cause the molecules of liquid 24 to disassociate. A magnetic field is also generated by the agitator 14, which assists in the treatment in all embodiments shown, FIGS. 2–6. Treatment devices such as pipe 38 are currently used to reduce scaling in plumbing in homes or in cleaning equipment. However, in FIG. 6 liquid 24 is forced through the charging mechanism over and over again. This improves the effectiveness of pipe 38 to put it on a par with the aforementioned other embodiments.

CONCLUSIONS, RAMIFICATIONS, AND SCOPE

Accordingly, it can be seen that the chemical-free liquid treatment process provides a very economical, safe, and environmentally conscious method for the preparation of cleaning solution. It can be particularly beneficial but not limited to the carpet, rug, upholstery and floor care industry. And it can be used with virtually any form of existing equipment for that trade, with very simple modifications.

Although the description above contains many specifics, these should not be construed as limiting the scope of the invention but as merely providing illustrations of some of the presently preferred embodiments of this invention. Various other embodiments and ramifications are possible within it's scope. For example, a variation to FIG. 5, but which operates in a similar way in that there are two electrodes and electrons are added to the water, is a water ionizer (not illustrated). Its electrodes are separated by a permeable membrane dividing two chambers. This setup allows the water to be separated into alkaline and acid water, due to the alkaline minerals in the tap water going to one electrode (negative) and the acid minerals going to the other (positive). In tests in hot water extraction or "steam" cleaning of a very heavily soiled carpet, alkaline water acted as a very effective pre-treatment. Either the acid water from the ionizer or the liquid 24 from one of the embodiments shown in this specification would be suitable rinsing agents for extraction. In the experiments conducted the cleaning results were surprisingly good, removing all but the most difficult stains. Another example would be the use of an apparatus as in FIG. 6 for the treatment of petroleum based fuels to improve their efficiency. Some modifications would need to be made in that the agitator would have to be of a design that would not produce excessive heat, such as a conventional recirculating pump mounted outside of the treatment chamber. And another embodiment, though not as practical for portable use as the embodiments earlier described, would be the use of a grounded treatment pipe. It would contain a solid rod composed of an alloy of several semi-precious metals in its center, connected to a conventional ground rod of sufficient length to be driven two meters into the ground, making it not portable.

Thus the scope of the invention should be determined by the appended claims and their legal equivalents, rather than by the limited examples given.

What is claimed is:

1. A method for cleaning an object on-site, the method comprising:
   a) putting a liquid in a holding tank;
   b) providing a non-soap, non-detergent means for altering the electron structure of the liquid within the tank;
   c) circulating said liquid such that substantially all said liquid is transiently proximate to said means; and,
   d) dispensing said liquid from said tank to its on-site destination of use.

2. A method for cleaning an object on-site, the method comprising:
   a) putting a liquid in a holding tank;
   b) providing an activated ceramic material within said tank;
   c) circulating said liquid such that substantially all said liquid is transiently proximate to said material;
   d) dispensing said liquid from said tank onto said object to be cleaned.

3. The method of claim 1 wherein said liquid is water.

4. The method of claim 2 wherein said activated ceramic is contained in a container.

5. The method of claim 4 wherein said activated ceramic is contained in multiple containers.

6. The method of claim 2 wherein said liquid is circulated by a means for pumping.

7. The method of claim 2 wherein said liquid is dispensed by a means for pumping.

8. A method for cleaning an object on-site, the method comprising:
   a) putting a liquid in a holding tank;
   b) providing a means for directing an electric current through said liquid;
   c) circulating said liquid such that substantially all said liquid is transiently conducting said current;
   d) dispensing said liquid from said tank onto said object to be cleaned.

9. The method of claim 8 wherein said liquid is water.

10. The method of claim 8 wherein said means comprises an aluminum conductor.

11. The method of claim 8 wherein said means comprises a carbon conductor.

12. The method of claim 8 wherein said liquid is circulated by a means for pumping.

13. The method of claim 8 wherein said liquid is dispensed by a means for pumping.

14. A method for cleaning an object on-site, the method comprising:
   a) putting a liquid in a holding tank;
   b) providing a means for generating a magnetic field;
   c) circulating said liquid such that substantially all said liquid transiently passes through said magnetic field;
   d) dispensing said liquid from said tank onto said object to be cleaned.

15. The method of claim 14 wherein said liquid is water.

16. The method of claim 14 wherein said means comprises a permanent magnet.

17. The method of claim 14 wherein said means comprises an electromagnet.

18. The method of claim 14 wherein said liquid is circulated by a means for pumping.

19. The method of claim 14 wherein said liquid is dispensed by a means for pumping.

* * * * *